US011597156B2

(12) United States Patent
Luan et al.

(10) Patent No.: US 11,597,156 B2
(45) Date of Patent: Mar. 7, 2023

(54) MONITORING ADDITIVE MANUFACTURING

(71) Applicant: Hewlett-Packard Development Company, L.P., Spring, TX (US)

(72) Inventors: He Luan, Palo Alto, CA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,336

(22) PCT Filed: Oct. 29, 2018

(86) PCT No.: PCT/US2018/057990
§ 371 (c)(1),
(2) Date: Dec. 31, 2020

(87) PCT Pub. No.: WO2020/091726
PCT Pub. Date: May 7, 2020

(65) Prior Publication Data
US 2021/0276270 A1 Sep. 9, 2021

(51) Int. Cl.
| | |
|---|---|
| *B29C 64/393* | (2017.01) |
| *B33Y 50/02* | (2015.01) |
| *B29C 64/209* | (2017.01) |
| *B29C 64/165* | (2017.01) |
| *G06N 3/04* | (2006.01) |

(Continued)

(52) U.S. Cl.
CPC .......... *B29C 64/393* (2017.08); *B29C 64/165* (2017.08); *B29C 64/209* (2017.08); *G06N 3/04* (2013.01); *G06T 7/0004* (2013.01); *B33Y 30/00* (2014.12); *B33Y 50/02* (2014.12); *G06T 2207/10048* (2013.01)

(58) Field of Classification Search
CPC ... B29C 64/165; B29C 64/205; B29C 64/209; B29C 64/393; B33Y 10/00; B33Y 30/00; B33Y 50/02; G06N 3/04; G06T 2207/10048; G06T 7/0004
See application file for complete search history.

(56) References Cited

U.S. PATENT DOCUMENTS 9,514,397 B2 12/2016 Peek
2014/0163717 A1* 6/2014 Das .......................... C30B 13/24
700/119

(Continued)

FOREIGN PATENT DOCUMENTS

CN 105555509 A 5/2016
CN 107548349 A 1/2018
(Continued)

Primary Examiner — Yuhui R Pan
(74) Attorney, Agent, or Firm — Shook, Hardy & Bacon, L.L.P.

(57) ABSTRACT

Examples of methods for monitoring additive manufacturing by an electronic device are described herein. In some examples, a predicted thermal image is calculated for a layer. In some examples, a captured thermal image is obtained for the layer. In some examples, a risk score is calculated for the layer based on the predicted thermal image and the captured thermal image. In some examples, a mitigation operation is performed in response to determining that the risk score is outside of a threshold range.

13 Claims, 5 Drawing Sheets

(51) Int. Cl.
   *G06T 7/00*      (2017.01)
   *B33Y 30/00*    (2015.01)

(56) References Cited

U.S. PATENT DOCUMENTS

| | | | |
|---|---|---|---|
| 2014/0308153 A1* | 10/2014 | Ljungblad | C22C 38/00 |
| | | | 419/53 |
| 2016/0136982 A1 | 5/2016 | Heath | |
| 2017/0144224 A1 | 5/2017 | DeMuth et al. | |
| 2017/0161888 A1* | 6/2017 | Banerjee | G06T 7/001 |
| 2017/0297095 A1 | 10/2017 | Zalameda | |
| 2018/0104897 A1 | 4/2018 | Novick | |
| 2018/0169948 A1 | 6/2018 | Coeck et al. | |
| 2018/0178287 A1 | 6/2018 | Mamrak et al. | |
| 2018/0322621 A1* | 11/2018 | Craeghs | G06T 7/001 |

FOREIGN PATENT DOCUMENTS

| | | | | |
|---|---|---|---|---|
| TW | 201726363 A | | 8/2017 | |
| WO | WO-2016200384 A1 * | | 12/2016 | B29C 64/165 |
| WO | WO-2017196345 A1 | | 11/2017 | |
| WO | WO-2017196350 A1 | | 11/2017 | |
| WO | WO-2018140034 A1 | | 8/2018 | |

\* cited by examiner

MONITORING ADDITIVE MANUFACTURING

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Figure 1:
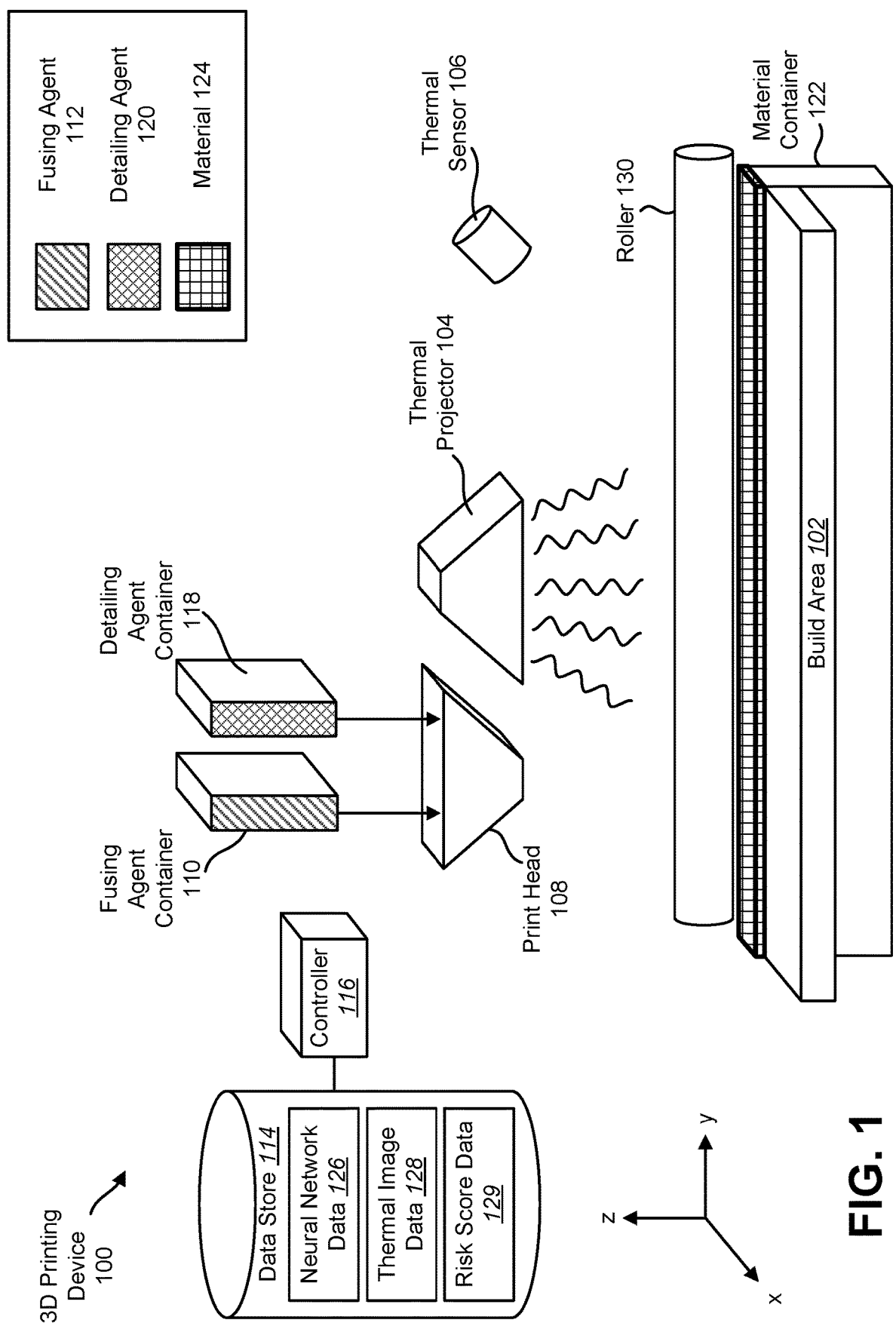
FIG. 1 is a simplified isometric view of an example of a 3D printing device that may be used in an example of monitoring additive manufacturing.

Additive manufacturing may be used to manufacture 3D objects. Three-dimensional (3D) printing is an example of additive manufacturing. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

Predicting transient thermal behavior may be used to monitor additive manufacturing. Thermal behavior may be expressed as a thermal image. A thermal image is a set of data indicating temperature (or thermal energy) in an area. In some examples, a neural network or networks may be used to calculate predicted thermal images. A predicted thermal image is a thermal image that is calculated using a machine learning model. For instance, the neural network or networks may utilize contone map or maps (e.g., voxel-level machine instructions that dictate the placement, quantity, and/or timing of an agent or agents in a build area) and/or a previous thermal image or images to predict a thermal image. A risk score may be calculated based on the predicted thermal image and a captured thermal image. A captured thermal image is a thermal image that is sensed or captured with a sensor. A risk score is an indication (e.g., numerical indication) of risk for part printing quality issues (e.g., risk of degraded printed parts), machine state drift, and/or other process control issues. It should be noted that while plastics may be utilized as a way to illustrate some of the approaches described herein, the techniques described herein may be applied to other variations of additive manufacturing.

Some examples of the techniques described herein may be utilized for additive manufacturing device run-time performance monitoring and/or health monitoring based on online thermal image prediction and thermal image sensing. In additive manufacturing, the online run-time monitoring may be utilized in various applications and/or use cases.

Because thermal behavior is directly related to end-part quality, the monitoring (e.g., risk score calculation) may be utilized to infer end-part quality in some examples. In some examples, the online thermal monitoring (e.g., risk score calculation) may be utilized to indicate whether the parts being printed will meet a quality criterion and/or whether the additive manufacturing device (e.g., printer) operation meets an operating criterion or whether the additive manufacturing device need maintenance. In some examples, the monitoring may be utilized in offline process diagnoses. For example, in offline process diagnoses, the layer monitoring statistics (e.g., risk scores corresponding to multiple layers) may be utilized to locate when and where a manufacturing problem began.

As used herein, the term "voxel" and variations thereof may refer to a "thermal voxel." In some examples, the size of a thermal voxel may be defined as a minimum that is thermally meaningful (e.g., larger than 42 microns or 600 dots per inch (dpi)). An example of voxel size is 25.4 millimeters (mm)/150≈170 microns for 150 dots per inch (dpi). A maximum voxel size may be approximately 490 microns or 50 dpi. The term "voxel level" and variations thereof may refer to a resolution, scale, or density corresponding to voxel size. The term "low resolution" and variations thereof may refer to a resolution, scale, or density that is lower than that of a voxel level. For example, a low resolution is lower than a voxel-level resolution. In some examples, a voxel-level resolution may be at least a scale factor (e.g., 5, 8, 10, 15, 20, etc.) greater than a low resolution. Low resolution may depend on the pixel resolution in a manufacturing device (e.g., machine, printer, etc.). For example, a low-resolution area size may have a dimension that ranges from 11 mm to 37 mm. While an example of low-resolution area size is given, other low-resolution area sizes may be utilized.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a simplified isometric view of an example of a 3D printing device 100 that may be used in an example of monitoring additive manufacturing. The 3D printing device 100 may include a controller 116, a data store 114, a build area 102, a print head 108, a fusing agent container 110, a detailing agent container 118, a roller 130, a material container 122, a thermal projector 104, and/or a thermal sensor 106. The example of a 3D printing device 100 in FIG. 1 may include additional components that are not shown, and some of the components described may be removed and/or modified without departing from the scope of the 3D printing device 100 in this disclosure. The components of the 3D printing device 100 may not be drawn to scale, and thus, may have a size and/or configuration different than what is shown.

In the example of FIG. 1, the 3D printing device 100 includes a fusing agent container 110, fusing agent 112, a detailing agent container 118, detailing agent 120, a material container 122, and material 124. In other examples, the 3D printing device 100 may include more or fewer containers, agents, hoppers, and/or materials. The material container 122 is a container that stores material 124 that may be applied (e.g., spread) onto the build area 102 by the roller 130 for 3D printing. The fusing agent container 110 is a container that stores a fusing agent 112. The fusing agent 112 is a substance (e.g., liquid, powder, etc.) that controls intake thermal intensity. For example, the fusing agent 112 may be selectively applied to cause applied material 124 to change phase with heat applied from the thermal projector 104 and/or to fuse with another layer of material 124. For instance, areas of material 124 where the fusing agent 112 has been applied may eventually solidify into the object being printed. The detailing agent 120 is a substance (e.g., liquid, powder, etc.) that controls outtake thermal intensity. For example, the detailing agent 120 may be selectively applied to detail edges of the object being printed.

The build area 102 is an area (e.g., surface) on which additive manufacturing may be performed. In some configurations, the build area 102 may be the base of a "build volume," which may include a volume above the base. As used herein, the term "build area" may refer to the base of a build volume and/or another portion (e.g., another plane above the base) of the build volume.

The roller 130 is a device for applying material 124 to the build area 102. In order to print a 3D object, the roller 130 may successively apply (e.g., spread) material 124 (e.g., a powder) and the print head 108 may successively apply and/or deliver fusing agent 112 and/or detailing agent 120. The thermal projector 104 is a device that delivers energy (e.g., thermal energy, heat, etc.) to the material 124, fusing agent 112, and/or detailing agent 120 in the build area 102. For example, fusing agent 112 may be applied on a material 124 layer where particles (of the material 124) are meant to fuse together. The detailing agent 120 may be applied to modify fusing and create fine detail and/or smooth surfaces. Exposure to energy (e.g., thermal energy from the thermal projector 104) causes reactions between the agents (e.g., fusing agent 112 and detailing agent 120) and the material 124, which may cause the material 124 to selectively fuse together to form the object.

The print head 108 is a device to apply a substance or substances (e.g., fusing agent 112 and/or detailing agent 120). The print head 108 may be, for instance, a thermal inkjet print head, a piezoelectric print head, etc. The print head 108 may include a nozzle or nozzles (not shown) through which the fusing agent 112 and/or detailing agent 120 are extruded. In some examples, the print head 108 may span a dimension of the build area 102. Although a single print head 108 is depicted, multiple print heads 108 may be used that span a dimension of the build area 102. Additionally, a print head or heads 108 may be positioned in a print bar or bars. The print head 108 may be attached to a carriage (not shown in FIG. 1). The carriage may move the print head 108 over the build area 102 in a dimension or dimensions.

The material 124 is a substance (e.g., powder) for manufacturing objects. The material 124 may be moved (e.g., scooped, lifted, and/or extruded, etc.) from the material container 122, and the roller 130 may apply (e.g., spread) the material 124 onto the build area 102 (on top of a current layer, for instance). In some examples, the roller 130 may span a dimension of the build area 102 (e.g., the same dimension as the print head 108 or a different dimension than the print head 108). Although a roller 130 is depicted, other means may be utilized to apply the material 124 to the build area 102. In some examples, the roller 130 may be attached to a carriage (not shown in FIG. 1). The carriage may move the roller 130 over the build area 102 in a dimension or dimensions. In some implementations, multiple material containers 122 may be utilized. For example, two material containers 122 may be implemented on opposite sides of the build area 102, which may allow material 124 to be spread by the roller 130 in two directions.

In some examples, the thermal projector 104 may span a dimension of the build area 102. Although one thermal projector 104 is depicted, multiple thermal projectors 104 may be used that span a dimension of the build area 102. Additionally, a thermal projector or projectors 104 may be positioned in a print bar or bars. The thermal projector 104 may be attached to a carriage (not shown in FIG. 1). The carriage may move the thermal projector 104 over the build area 102 in a dimension or dimensions.

In some examples, each of the print head 108, roller 130, and thermal projector 104 may be housed separately and/or may move independently. In some examples, two or more of the print head 108, roller 130, and thermal projector 104 may be housed together and/or may move together. In one example, the print head 108 and the thermal projector 104 may be housed in a print bar spanning one dimension of the build area 102, while the roller 130 may be housed in a carriage spanning another dimension of the build area 102. For instance, the roller 130 may apply a layer of material 124 in a pass over the build area 102, which may be followed by a pass or passes of the print head 108 and thermal projector 104 over the build area 102.

The controller 116 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 116 may be connected to other components of the 3D printing device 100 via communication lines (not shown).

The controller 116 may control actuators (not shown) to control operations of the components of the 3D printing device 100. For example, the controller 116 may control an actuator or actuators that control movement of the print head 108 (along the x-, y-, and/or z-axes), actuator or actuators that control movement of the roller 130 (along the x-, y-, and/or z-axes), and/or actuator or actuators that control movement of the thermal projector 104 (along the x-, y-, and/or z-axes). The controller 116 may also control the actuator or actuators that control the amounts (e.g., proportions) of fusing agent 112 and/or detailing agent 120 to be deposited by the print head 108 from the fusing agent container 110 and/or detailing agent container 118. In some examples, the controller 116 may control an actuator or actuators that raise and lower build area 102 along the z-axis. The controller 116 may control the thermal sensor 106. For example, the thermal sensor 106 may be included in (e.g., integrated, built-in, mounted to) the 3D printing device 100, and the controller 116 may request and/or receive thermal images from the thermal sensor 106.

The controller 116 may communicate with a data store 114. The data store 114 may include machine-readable instructions that cause the controller 116 to control the supply of material 124, to control the supply of fusing agent 112 and/or detailing agent 120 to the print head 108, to control movement of the print head 108, to control movement of the roller 130, and/or to control movement of the thermal projector 104.

In some examples, the controller 116 may control the roller 130, the print head 108, and/or the thermal projector 104 to print a 3D object based on a 3D model. For instance, the controller 116 may utilize a contone map or maps that are based on the 3D model to control the print head 108. A contone map is a set of data indicating a location or locations (e.g., areas) for printing a substance (e.g., fusing agent 112 or detailing agent 120). In some examples, a contone map may include or indicate machine instructions (e.g., voxel-level machine instructions) for printing a substance. For example, a fusing agent contone map indicates coordinates and/or an amount for printing the fusing agent 112. In an example, a detailing agent contone map indicates coordinates and/or an amount for printing the detailing agent 120. In some examples, a contone map may correspond to a two-dimensional (2D) layer (e.g., 2D slice, 2D cross-section, etc.) of the 3D model. For instance, a 3D model may be processed to produce a plurality of contone maps corresponding to a plurality of layers of the 3D model. In some examples, a contone map may be expressed as a 2D grid of values, where each value may indicate whether to print an agent and/or an amount of agent at the location on the 2D grid. For instance, the location of a value in the 2D grid may correspond to a location in the build area 102 (e.g., a location (x, y) of a particular level (z) at or above the build area 102). In some examples, a contone map may be a compressed version of the aforementioned 2D grid or array (e.g., a quadtree).

The data store 114 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions for controlling the 3D printing device 100. A computer-readable medium is an example of a machine-readable storage medium that is readable by a processor or computer.

In some examples, the data store 114 may store neural network data 126, thermal image data 128, and/or risk score data 129. In some examples, the data store 114 may store contone maps (e.g., fusing agent contone maps and/or detailing agent contone maps). The neural network data 126 includes data and/or model implementation defining a neural network or neural networks. For instance, the neural network data 126 may define a node or nodes, a connection or connections between nodes, a network layer or network layers, and/or a neural network or neural networks. Examples of neural networks include convolutional neural networks (CNNs) (e.g., CNN, deconvolutional neural network, inception module, residual network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized.

In some examples, a neural network may include an input layer or layers, an encoder layer or layers, a spatiotemporal layer (e.g., RNN layer), a decoder layer or layers, and/or an output layer or layers. For example, next to the input layer, an encoder layer may extract features from inputs. The spatiotemporal layer may learn both sequential and spatial information from a contone map or maps and a captured thermal image or images (e.g., from online or real-time in-machine thermal sensing). The decoder layer may translate features into an output domain and may be situated before the output layer. Each layer may include a node or nodes (e.g., more than one node (or perceptron)) in some implementations. In some examples, a neural network may be connected to another neural network or networks, may include another neural network or networks, and/or may be merged (e.g., stacked) with another neural network or networks. In some examples, another neural network or networks may be utilized as an encoder or decoder.

In some examples, the controller 116 uses the neural network or networks (defined by the neural network data 126) to predict thermal images. A thermal image is a set of data indicating temperature (or thermal energy) in an area. In some examples, a thermal image may be a 2D grid of heat values, where each heat value indicates a temperature (or thermal energy) corresponding to a location in the 2D grid. In some examples, each location in the 2D grid may correspond to a location in the build area 102 (e.g., a location (x, y) of a particular level (z) at or above the build area 102). A thermal image may be calculated (e.g., predicted) or captured (e.g., sensed) from a thermal sensor 106. For example, the thermal sensor 106 may capture a thermal image of a layer.

In some examples, the controller 116 may calculate (e.g., predict), using a neural network or a plurality of neural networks, a predicted thermal image of a layer based on a contone map or a plurality of contone maps (e.g., a fusing contone map and a detailing contone map) and a captured thermal image or images (e.g., online or real-time in-machine thermal sensing of previous layers). The contone map or maps and captured thermal image(s) may be utilized as inputs to the neural network or networks. For instance, voxel-level contone map or maps may be used in some approaches because the contone map or maps may enable voxel-level energy control. In some examples, captured thermal images may be utilized because they may enable an inference of thermal diffusion. The predicted thermal image or images may be stored in the data store 114 as thermal image data 128. A thermal image for a layer may be "predicted" before, during, and/or after forming a layer. For example, a thermal image may be predicted for a layer that has not yet been applied and/or printed. Additionally or alternatively, thermal behavior (e.g., a thermal image) may be predicted for a layer at a time after application and/or printing. As used herein, the term "predict" and variants thereof may denote calculating with a machine learning model (e.g., neural network or networks). In some approaches, a predicted thermal image of a layer may be computed independently of capturing a thermal image of the layer.

A contone map may be a representation of agent placement (e.g., placement and/or quantity for a fusing agent and/or placement and/or quantity for a detailing agent). While contone maps are given as examples of data input into the neural network or networks, other information or data may be utilized in addition to or alternatively from contone maps. For example, slices may be utilized to assist predicting thermal images and/or may be utilized as an alternative learning dataset. In particular, slices may be used instead of a contone map or contone maps or in addition to a contone map or contone maps in some examples.

The thermal sensor 106 is a device that senses or captures thermal data. In some examples, the thermal sensor 106 is included in (e.g., integrated into, built-in, part of, and/or mounted to) the 3D printing device 100. In some examples, the thermal sensor 106 may capture thermal images of the build area 102. For instance, the thermal sensor 106 may be an infrared thermal sensor (e.g., camera) that captures thermal images of the build area 102 (e.g., applied material in the build area 102). In some examples, the thermal sensor 106 may capture thermal images online. As used herein, the term "online" means during a manufacturing process. For example, the thermal image sensor 106 may capture a thermal image of each layer upon printing and/or may capture one or multiple images during or upon material deposition, agent application, and/or thermal projection. Capturing thermal images online (e.g., in real time) may enable online (e.g., real-time) comparison of a captured thermal image and a predicted thermal image. The thermal image or images may indicate thermal variation (e.g., temperature variation) over the build area 102. In some examples, a thermal image may be a two-dimensional (2D) grid of sensed temperatures (or thermal energy). For example, thermal sensing over the build area 102 may indicate (e.g., capture and encapsulate) environmental complexity and heterogeneous thermal diffusivity. In some approaches, the thermal image or images may be transformed to align with a contone map or contone maps (e.g., registered with the contone map or maps). In some examples, the controller 116 may receive a captured thermal image of a layer from the thermal sensor 106. For example, the controller 116 may command the thermal sensor 106 to capture a thermal image and may receive a captured thermal image in response. The thermal sensor 106 may capture a thermal image for each layer of an object being manufactured.

In some examples, the controller 116 may compute a predicted thermal image based on the thermal image or images. For instance, the controller 116 may utilize the contone map or maps and thermal image or images as inputs to the neural network or networks. The neural network or networks may be used to compute the predicted thermal image or images based on the contone map or maps and the thermal image or images.

A thermal image may correspond to a layer at a particular time (e.g., at a time the thermal image is captured). Predicting, calculating, or computing the predicted thermal image may include calculating the predicted thermal image of the layer before, at, or after a time that the layer is formed.

It should be noted that thermal images may be utilized to train the neural network or networks in some examples. For instance, the controller 116 may compute a loss function based on the predicted thermal image and the thermal image. The neural network or networks may be trained based on the loss function.

In some examples, the controller 116 may determine a risk score for a layer based on the predicted thermal image and the captured thermal image. A risk score is a measure of risk of additive manufacturing problems. For example, a risk score may provide an indication of risk for part printing quality issues (e.g., risk of degraded printed parts), machine state drift, and/or other process control issues. In some examples, the risk score indicates a degree of deviation from expected additive manufacturing performance.

In some examples, the neural network or networks (e.g., voxel-level thermal prediction model) may be based on physical thermal influencers and may be expected to have learned the mechanism to simulate how heat will be generated with the input. Accordingly, the predicted thermal image may be compared with the sensed thermal image to indicate whether the additive manufacturing process follows the expected mechanism. Deviation from the expected mechanism may indicate risks to quality of the printed objects (e.g., end parts), machine state drift over time, and other process control issues. In some examples, the risk score may be determined, calculated, or computed with a counting approach, a value (e.g., L1 norm, L2 norm) approach, or a combination of counting and value approaches. More detail on approaches for calculating the risk score are given in connection with FIG. 4.

In some examples, the risk score may be determined with weightings based on a shape map. A shape map is data indicating a region or regions of an object or objects for additive manufacturing. 3D models, slices of 3D models, and/or contone maps may be examples of shape maps. A weighting is a numeric value for scaling (e.g., emphasizing or deemphasizing) a calculation. The weightings may include a weighting corresponding to an object area of the shape map and a weighting corresponding to a non-object area of the shape map. An object area is an area or areas where an object is to be formed or manufactured. A non-object area is an area or areas where an object is not to be formed or manufactured. The weighting corresponding to the object area may be greater than the weighting corresponding to the non-object area. For example, when calculating the risk score, different weights may be applied to object and non-object (e.g., powder) areas. Since the object thermal control may be directly related to the end-part quality, it may be beneficial to weight the object areas more than the powder areas. Accordingly, the shape map of the current layer may be used as a mask to divide the pixels in the thermal image and/or predicted thermal image into the object area and powder area. As used herein, a "pixel" is a component of an image corresponding to a location in the image. For example, a pixel in a thermal image may indicate a temperature or thermal energy at a location of the thermal image. When calculating the risk score, more weight may be placed on the voxels from the part area than the voxels from the powder area.

In some examples, the weightings include a first weighting corresponding to a first area including an expanded object area and a second weighting corresponding to a second area that is complementary to the first area. The first weighting may be greater than the second weighting. For example, mask may not precisely correspond to the shape map in some approaches. The thermal control over voxels around the shape boundary may be a significant factor in end-part quality. Accordingly, the object area or areas in the shape map may be expanded by an amount (e.g., a number of pixels, a number of voxels, a percentage of object size, etc.) to generate the mask. By using the mask, more weight may be placed on the voxels around shape boundaries.

In some examples, the controller 116 may determine whether to perform a mitigation operation based on the risk score. A mitigation operation is an operation to reduce risk, to alert regarding risk, and/or to avoid risk. Examples of a mitigation operation include presenting a message (e.g., presenting a message on a display, sending a message (e.g., email, text, voice message, image, icon, etc.) to a device, and/or halting manufacturing. Halting manufacturing is stopping or discontinuing manufacturing. In some examples, the controller 116 may perform a mitigation operation in response to determining that the risk score is outside of a threshold range for a layer or for a number of layers (e.g., successive layers).

In some examples, the controller 116 may monitor the 3D printing device 100 based on the risk score. For example, the controller 116 may perform a mitigation operation based on the risk score. In some examples, the controller 116 may send a message and/or halt manufacturing based on the risk score as described herein.

Figure 2:
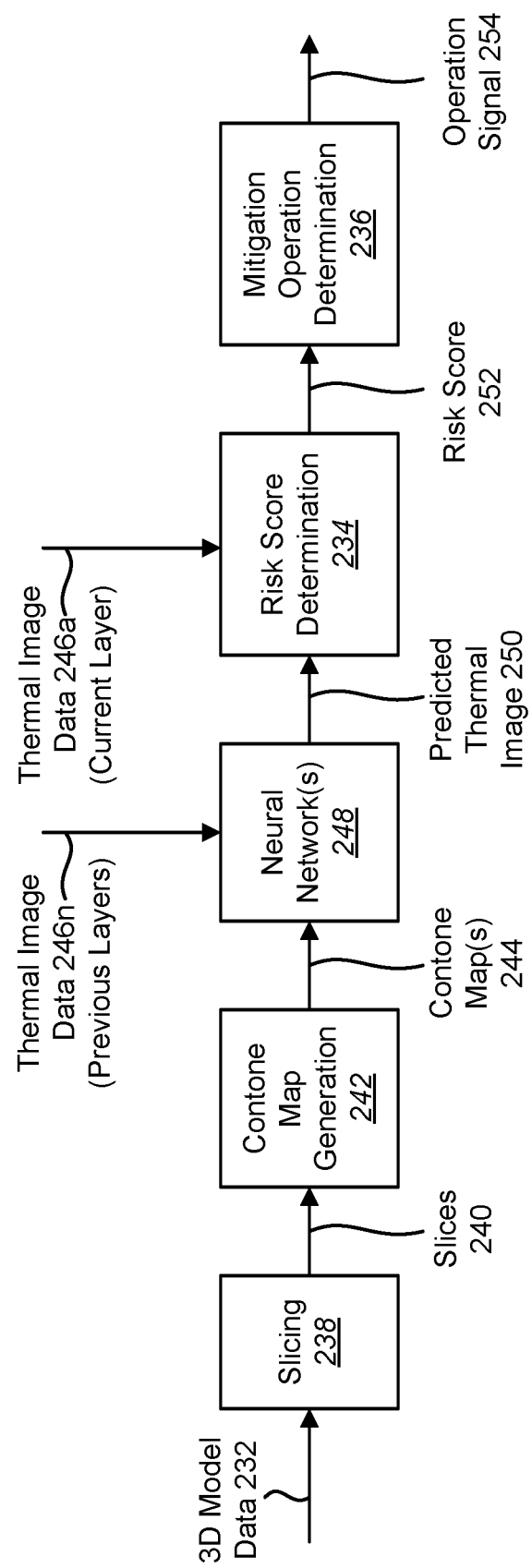
FIG. 2 is a block diagram illustrating examples of functions that may be implemented to monitor additive manufacturing.

FIG. 2 is a block diagram illustrating examples of functions that may be implemented to monitor additive manufacturing. In some examples, one, some, or all of the functions described in connection with FIG. 2 may be performed by the controller 116 described in connection with FIG. 1. For instance, instructions for slicing 238, contone map generation 242, neural network or networks 248, risk score determination 234, and/or mitigation operation determination 236 may be stored in the data store 114 and executed by the controller 116 in some examples. In other examples, a function or functions (e.g., slicing 238, contone map generation 242, neural network or networks 248, risk score determination 234, and/or mitigation operation determination 236) may be performed by another apparatus. For instance, slicing 238 may be carried out on a separate apparatus and sent to the 3D printing device 100.

3D model data 232 may be obtained. For example, the 3D model data 232 may be received from another device and/or generated. The 3D model data may specify shape and/or size of a 3D model for printing a 3D object. 3D model data 232 can define both the internal and the external portion of the 3D object. The 3D model data 232 can be defined, for example, using polygon meshes. For example, the 3D model data 232 can be defined using a number of formats such as a 3MF file format, an object (OBJ) file format, and/or a stereolithography (STL) file format, among other type of files formats.

Slicing 238 may be performed based on the 3D model data 232. For example, slicing 238 may include generating a set of 2D slices 240 corresponding to the 3D model data 232. In some approaches, the 3D model indicated by the 3D model data 232 may be traversed along an axis (e.g., a vertical axis, z-axis, or other axis), where each slice 240 represents a 2D cross section of the 3D model. For example, slicing 238 the 3D model can include identifying a z-coordinate of a slice plane. The z-coordinate of the slice plane can be used to traverse the 3D model to identify a portion or portions of the 3D model intercepted by the slice plane. The slices 240 may be examples of the shape maps described herein.

Contone map generation 242 may be performed based on the slices 240. In some examples, a contone map or contone maps 244 may be generated 242 for each slice 240. For instance, contone map generation 242 may include generating a fusing contone map and a detailing contone map, where the fusing contone map indicates an area or areas and density distribution for printing fusing agent for a layer. The detailing contone map indicates an area or areas and density distribution for printing detailing agent for the layer. The contone map or maps 244 may be represented in a variety of file formats in some examples. For instance, a contone map 244 may be formatted as a BKZ contone file, a SIF contone file, and/or another kind of contone file.

The neural network or networks 248 may be used to calculate (e.g., predict) a predicted thermal image 250 based on the contone map or maps 244. In some examples, computing the predicted thermal image 250 may also be based on thermal image data 246n from previous layer or layers. For example, the neural network or networks 248 may be utilized to calculate the predicted thermal image 250 online (e.g., in real time).

Risk score determination 234 may be performed based on the predicted thermal image 250 and thermal image data 246a of a current layer (e.g., a captured thermal image of a most recently formed layer). For example, a risk score 252 may be calculated for a layer based on the predicted thermal image 250 and the thermal image data 246a using a counting approach and/or a value approach. In some examples, the thermal image capture may be performed online (e.g., in real time).

Mitigation operation determination 236 may be performed based on the risk score 252. For example, mitigation operation determination 236 may produce an operation signal 254 that indicates whether to send an alert and/or to halt additive manufacturing based on the risk score 252. In some examples, an alert may be set if the risk score 252 is outside of a threshold range and/or additive manufacturing may be halted if the risk score 252 is outside of a threshold range for a successive number of layers.

Figure 3:
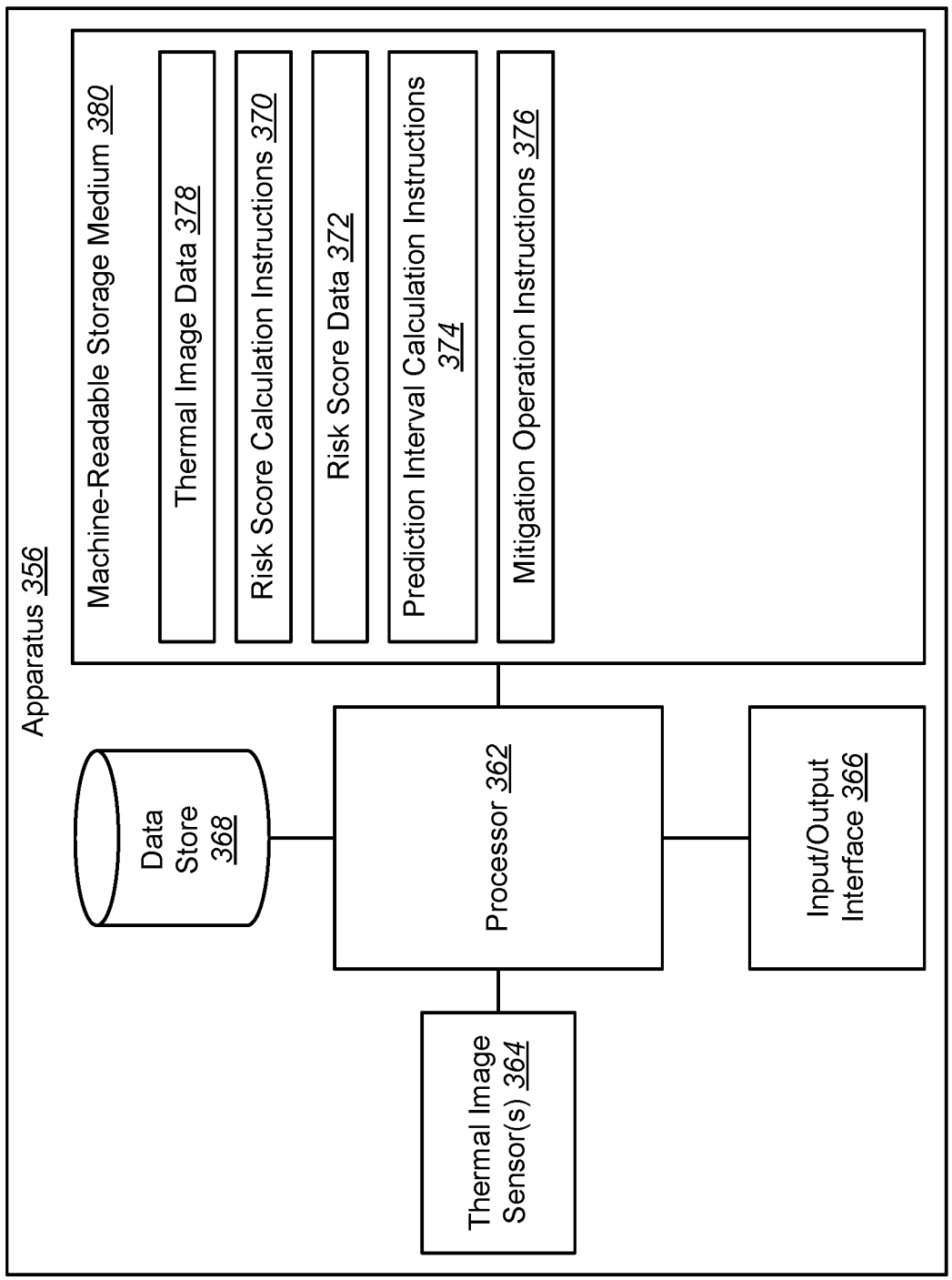
FIG. 3 is a block diagram of an example of an apparatus that may be used in monitoring additive manufacturing.

FIG. 3 is a block diagram of an example of an apparatus 356 that may be used in monitoring additive manufacturing. The apparatus 356 may be a computing device, such as a personal computer, a server computer, a printer, a 3D printer, a smartphone, a tablet computer, etc. The apparatus 356 may include and/or may be coupled to a processor 362, a data store 368, an input/output interface 366, a machine-readable storage medium 380, and/or a thermal image sensor or sensors 364. In some examples, the apparatus 356 may be in communication with (e.g., coupled to, have a communication link with) an additive manufacturing device (e.g., the 3D printing device 100 described in connection with FIG. 1). Alternatively, the apparatus 356 may be an example of the 3D printing device 100 described in connection with FIG. 1. For instance, the processor 362 may be an example of the controller 116 described in connection with FIG. 1, the data store 368 may be an example of the data store 114 described in connection with FIG. 1, and the thermal image sensor or sensors 364 may be an example of the thermal sensor 106 described in connection with FIG. 1. The apparatus 356 may include additional components (not shown) and/or some of the components described herein may be removed and/or modified without departing from the scope of this disclosure.

The processor 362 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 380. The processor 362 may fetch, decode, and/or execute instructions (e.g., risk score calculation instructions 370, prediction interval calculation instructions 374, and/or mitigation operation instructions 376) stored on the machine-readable storage medium 380. Additionally or alternatively, the processor 362 may include an electronic circuit or circuits that include electronic components for performing a functionality or functionalities of the instructions (e.g., risk score calculation instructions 370, prediction interval calculation instructions 374, and/or mitigation operation instructions 376). In some examples, the processor 362 may be configured to perform one, some, or all of the functions, operations, steps, methods, etc., described in connection with one, some, or all of FIGS. 1-2 and/or 4-5.

The machine-readable storage medium 380 may be any electronic, magnetic, optical, or other physical storage device that contains or stores electronic information (e.g., instructions and/or data). Thus, the machine-readable storage medium 380 may be, for example, Random Access Memory (RAM), Electrically Erasable Programmable Read-Only Memory (EEPROM), a storage device, an optical disc, and the like. In some implementations, the machine-readable storage medium 380 may be a non-transitory tangible machine-readable storage medium, where the term "non-transitory" does not encompass transitory propagating signals.

The apparatus 356 may also include a data store 368 on which the processor 362 may store information. The data store 368 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 380 may be included in the data store 368. Alternatively, the machine-readable storage medium 380 may be separate from the data store 368. In some approaches, the data store 368 may store similar instructions and/or data as that stored by the machine-readable storage medium 380. For example, the data store 368 may be non-volatile memory and the machine-readable storage medium 380 may be volatile memory.

The apparatus 356 may further include an input/output interface 366 through which the processor 362 may communicate with an external device or devices (not shown), for instance, to receive and store the information pertaining to the object or objects to be manufactured (e.g., printed). The input/output interface 366 may include hardware and/or machine-readable instructions to enable the processor 362 to communicate with the external device or devices. The input/output interface 366 may enable a wired or wireless connection to the external device or devices. The input/output interface 366 may further include a network interface card and/or may also include hardware and/or machine-readable instructions to enable the processor 362 to communicate with various input and/or output devices, such as a keyboard, a mouse, a display, another apparatus, electronic device, computing device, etc., through which a user may input instructions into the apparatus 356.

In some examples, the machine-readable storage medium 380 may store thermal image data 378. The thermal image data 378 may be obtained (e.g., received) from a thermal image sensor or sensors 364 and/or may be predicted. In some examples, the apparatus 356 may include a thermal image sensor or sensors 364, may be coupled to a remote thermal image sensor or sensors, and/or may receive thermal image data 378 (e.g., a thermal image or images) from a (integrated and/or remote) thermal image sensor. Some examples of thermal image sensors 364 include thermal cameras (e.g., infrared cameras). Other kinds of thermal sensors may be utilized. In some examples, thermal sensor resolution may be less than voxel resolution (e.g., each temperature readout may cover an area that includes multiple voxels). For example, a low-resolution thermal camera (with a resolution of 31×30 pixels, 80×60 pixels, etc., for instance) may be utilized. In other examples, the thermal image sensor or sensors 364 may provide voxel-level (or near voxel-level) thermal sensing.

The thermal image data 378 may include a thermal image or images. As described above, a thermal image may be an image that indicates heat (e.g., temperature) over an area and/or volume. For example, a thermal image may indicate a build area temperature distribution (e.g., thermal temperature distribution over a top layer). In some examples, the thermal image sensor or sensors 364 may undergo a calibration procedure to overcome distortion introduced by the thermal image sensor or sensors 364. For example, a thermal image may be transformed to register the thermal image with the contone map or maps. Different types of thermal sensing devices may be used in different examples.

The processor 362 may execute the risk score calculation instructions 370 to calculate risk scores. The risk scores may be stored as risk score data 372. Each risk score may correspond to a layer. For example, the processor 362 may execute the risk score calculation instructions 370 to calculate a risk score based on a predicted thermal image of a layer and a captured thermal image of the layer. In some examples, a risk score may be calculated using a counting approach, a value (e.g., L1 norm, L2 norm) approach, or a combination of counting and value approaches. In some examples, the risk score may be calculated with weightings (based on a shape map, for instance).

The processor 362 may execute the prediction interval calculation instructions 374 to calculate a prediction interval based on a set of risk scores. A prediction interval is a predicted range of risk score. The size of the prediction interval may be determined based on a model used and a target accuracy level. The model parameters may be pre-trained to produce the prediction interval. For example, the set of risk scores may be modeled as a time series to calculate the prediction interval. In some approaches, a variety of time series models may be adopted to model the set of risk scores (e.g., a series or risk scores) corresponding to a number (e.g., N) of previous layers. Examples of time series models that may be utilized include autoregressive integrated moving average (ARIMA) time series models. In some examples, a predicted risk score for a layer may be calculated based on the set of risk scores corresponding to previous layers. In a case that an actual risk score is within the prediction interval, then the prediction may be regarded as correct. For example, in a case that the risk score is within the prediction interval, the printing process may be regarded as functioning normally or in accordance with a criterion.

The processor 362 may execute the mitigation operation instructions to determine whether to perform a mitigation operation based on the risk score. For example, the processor 362 may determine whether a risk score for a layer is outside of the prediction interval. In some examples, a mitigation operation may be performed in a case that the risk score is outside of the prediction interval. In some examples, a mitigation operation may be performed in a case that a number of risk scores (e.g., a threshold number of risk scores, a threshold number of successive risk scores, etc.) is outside of the prediction interval. As described herein, examples of a mitigation operation include presenting a message (e.g., presenting a message on a display, sending a message (e.g., email, text, voice message, image, icon, etc.) to a device, and/or halting manufacturing. In an example, the processor 362 may execute the mitigation operation instructions 376 to present a message (e.g., an alert) via the input/output interface 366 in a case that a risk score is outside a prediction interval or a number of risk scores are outside of corresponding prediction intervals. For example, the processor 362 may present an alert on a display, may send an email alert, may send a text alert, etc., via the input/output interface 366. In an example, the processor 362 may execute the mitigation operation instructions 376 to halt manufacturing in a case that a risk score is outside a prediction interval or a number of risk scores are outside of corresponding prediction intervals. For instance, if M risk scores correspond to M successive layers are outside of corresponding prediction intervals, the processor 362 may issue a command to halt manufacturing. In some examples, the command to halt manufacturing may be executed locally (by the apparatus 356) or may be sent to another device via the input/output interface 366.

Some examples of the monitoring approaches described herein may be beneficial. For example, if the manufacturing (e.g., printing) process follows the expected behavior (e.g., the voxel-level thermal prediction may capture most of the layer thermal behavior), then the risk score of each layer may be relatively stable. If the risk score of a layer exceeds the prediction interval generated from the previous layers, this may indicate that the manufacturing process no longer follows the expected behavior. This may indicate that the end-part quality may have some issues and/or may indicate that the machine state has drifted and may no longer be operating in accordance with a criterion. Accordingly, a message (e.g., alert, warning, etc.) may be sent to the operator. If the risk score is continually outside of the prediction interval, the manufacturing process may be increasingly deviating from the expected behavior, and part quality may become less reliable. Accordingly, manufacturing may be halted if the risk score is continually outside of the prediction interval.

In some examples, the machine-readable storage medium 380 may store 3D model data (not shown in FIG. 3). The 3D model data may be generated by the apparatus 356 and/or received from another device. In some examples, the machine-readable storage medium 380 may include slicing instructions (not shown in FIG. 3). For example, the processor 362 may execute the slicing instructions to perform slicing on the 3D model data to produce a stack of 2D vector slices.

In some examples, the processor 362 may execute contone map generation instructions (not shown in FIG. 3) to produce contone map data. The contone map data may indicate agent distribution (e.g., fusing agent distribution and/or detailing agent distribution) at the voxel level for printing a 3D object. For instance, the contone map data may be utilized as per-layer machine instructions (e.g., voxel-level machine instructions) for agent distribution.

It should be noted that multiple different agent contone maps corresponding to different abilities to absorb or remove thermal energies may be utilized in some examples. Additionally or alternatively, some examples may utilize different print modes where multiple contone maps may be used for each agent.

For a given layer (e.g., a current layer, a top layer, etc.), the contone map or maps of all agents deposited to the layer may be an energy driving force in some examples. It should be noted that another voxel-level energy influencer may include neighboring voxels in previous layers that may have a temperature differential compared to a given voxel, which may induce heat flux into or out of the voxel.

In some examples, the machine-readable storage medium 380 may store neural network data (not shown in FIG. 3). The neural network data may include data defining a neural network or neural networks. For instance, the neural network data may define a node or nodes, a connection or connections between nodes, a network layer or network layers, and/or a neural network or neural networks. In some examples, the processor 362 may utilize the neural network data to calculate predicted thermal images. A predicted thermal image or images may be stored as thermal image data 378 on the machine-readable storage medium 380.

In some examples, the machine-readable storage medium 380 may store 3D printing instructions. For instance, the processor 362 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a contone map or contone maps (stored as contone map data, for instance) to control a print head or heads to print an agent or agents in a location or locations specified by the contone map or maps. In some examples, the processor 362 may execute the 3D printing instructions to print a layer or layers. The printing (e.g., thermal projector control) may be based on thermal images (e.g., captured thermal images and/or predicted thermal images).

In some examples, the machine-readable storage medium 380 may store neural network training instructions. The processor 362 may execute the neural network training instructions to train a neural network or neural networks (defined by the neural network data, for instance). For example, the neural network training instructions may include a loss function. The processor 362 may compute the loss function based on a predicted thermal image and a thermal image. For example, the thermal image may provide the ground truth (which may or may not be at voxel-level) for the loss function. The loss function may be utilized to train a neural network or neural networks. For example, a node or nodes and/or a connection weight or weights in the neural network or networks may be adjusted based on the loss function in order to improve the prediction accuracy of the neural network or networks. It should be noted that not all of the steps and/or features described in connection with FIG. 3 may be required in all implementations.

In some examples, the apparatus 356 may implement a thermal prediction based run-time monitoring strategy 3D printing. The strategy may include monitoring the thermal processes by comparing the predicted (e.g., expected) thermal images and the captured thermal images. The comparison may be performed at the voxel level and/or at low resolution. In some examples, the strategy may include a risk assessment approach based on quantifying the difference between a captured thermal image and a predicted thermal image for a layer at different levels (e.g., at low resolution and voxel level). The strategy may include sending an alert (e.g., warning message) to an operator or operators and/or may include halting the job.

Figure 4:
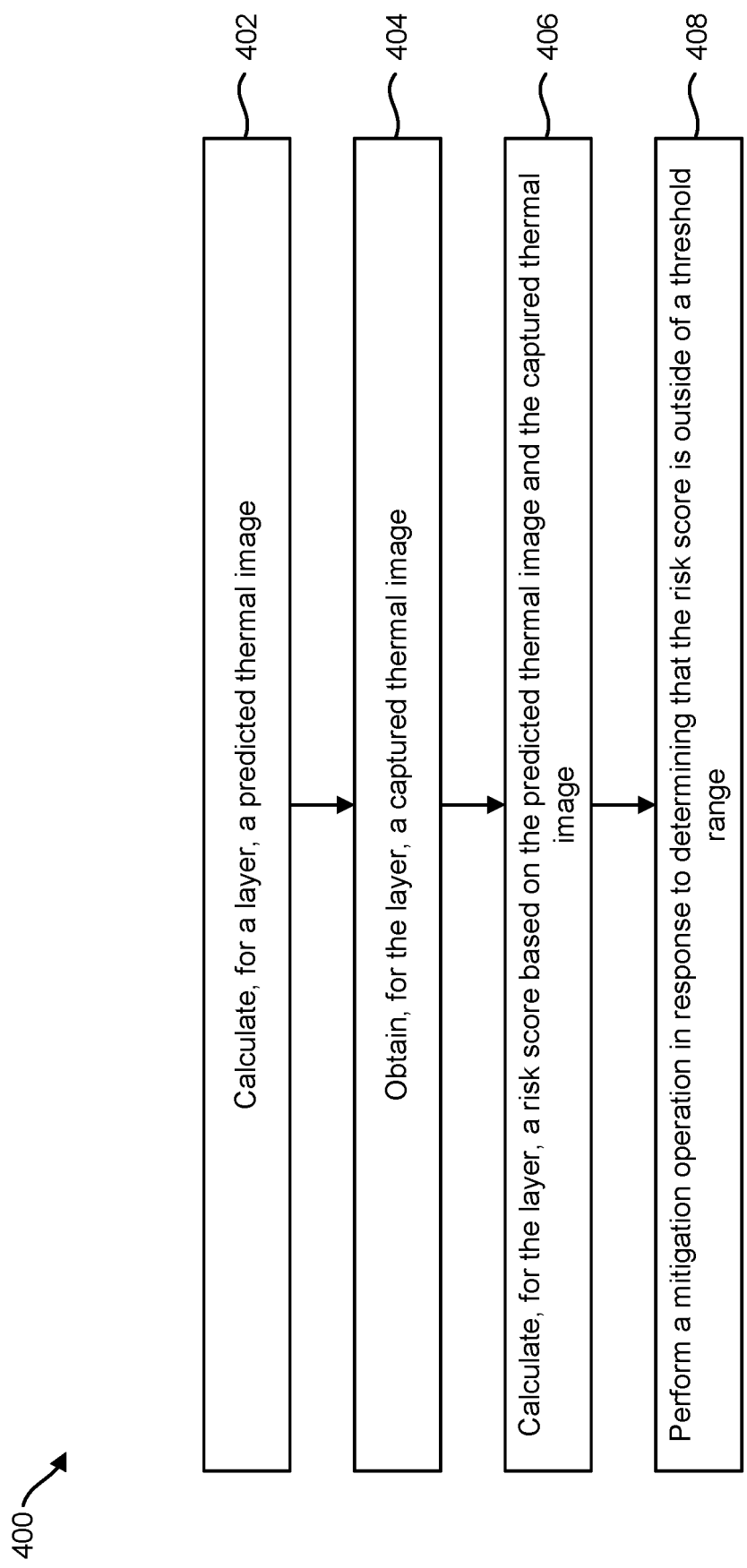
FIG. 4 is a flow diagram illustrating an example of a method for monitoring additive manufacturing.

FIG. 4 is a flow diagram illustrating an example of a method 400 for monitoring additive manufacturing. The method 400 and/or a method 400 step or steps may be performed by an electronic device. For example, the method 400 may be performed by the apparatus 356 described in connection with FIG. 3 (and/or by the 3D printing device 100 described in connection with FIG. 1).

The apparatus 356 may calculate 402, for a layer, a predicted thermal image. For example, at least one neural network may utilize contone map or maps (e.g., voxel-level machine instructions) and/or thermal image or images corresponding to previous layer or layers to predict the thermal image. In some examples, calculating 402 the predicted thermal image for the layer may be independent of thermal sensing for the layer.

In some examples, while printing and before printing each layer, the apparatus 356 may use thermal sensing of previous layers, and fusing agent and/or detailing agent contone maps of multiple layers (including previous layers and a current layer, for instance), to predict a thermal image (e.g., a voxel-level thermal image) of the current layer. The thermal sensing may be online (e.g., real-time) and in-machine in some examples. The predicted thermal image calculation may be accomplished using a deep neural network (DNN).

The apparatus 356 may obtain 404, for the layer, a captured thermal image. For example, after the layer has been deposited, the apparatus 356 may obtain 404 a captured thermal image of the layer using a thermal image sensor 364 or may receive a captured thermal image of the layer from a remote image sensor.

The apparatus 356 may calculate, for the layer, a risk score based on the predicted thermal image and the captured thermal image. For example, after printing each layer, the predicted thermal image may be compared with the actual captured thermal image sensed in-situ to calculate the risk score for the layer. In some examples, the apparatus 356 may calculate the risk score using a counting approach, a value (e.g., L1 norm, L2 norm) approach, or a combination of counting and value approaches.

In some examples, calculating the risk score may include determining a difference between a pixel of the predicted thermal image and a pixel of the captured thermal image for a set of pixels, and counting a number of pixels having the difference greater than a threshold. Counting the number of pixels having the different greater than a threshold may be referred to as the counting approach. For example, for one pixel, if the difference between the predicted thermal image and the captured thermal image exceeds a threshold (e.g., a 3 degrees Celsius (C) difference between the captured thermal image pixel and the predicted thermal image pixel), then the pixel may be marked as deviating. Then, the number of pixels marked as deviating may be counted.

In some examples, calculating the risk score may include determining a difference between a pixel of the predicted thermal image and a pixel of the captured thermal image for a set of pixels, and calculating an L1 norm, an L2 norm, or a combination of the L1 norm and the L2 norm of the difference. The L1 norm and L2 norm are mathematical functions that express a degree, length, or size. For example, the L1 norm and/or the L2 norm may be utilized to express a degree of difference between a pixel of the predicted thermal image and a pixel of the captured thermal image. Calculating an L1 norm, an L2 norm, or a combination of the L1 norm and the L2 norm of the difference may be referred to as the value approach.

It should be noted that the counting approach may uniformly account for each voxel, while the value approach may also consider the specific difference value at each voxel. Depending on monitoring objectives, the risk score may be calculated using the counting approach, the value approach, or a combination of the counting approach and the value approach. It should be noted that the calculation of the risk score may account for different weightings as described herein. For example, the risk score calculation may also be based on weightings (e.g., weightings based on a shape map and/or mask).

In some examples, the risk score may be calculated 406 based on the predicted thermal image and the captured thermal image at a voxel-level resolution. In some examples, a neural network (e.g., DNN) may be utilized to enhance the resolution of the captured thermal image. In some examples, the captured thermal image may be at a low resolution that is below voxel-level resolution. The captured thermal image at the low resolution may be enhanced into the voxel-level resolution using a neural network. Then, the (enhanced) voxel-level resolution captured thermal image may be compared with the voxel-level resolution predicted thermal image to calculate the risk score.

In some examples, the risk score may be calculated 406 based on the predicted thermal image and the captured thermal image at a low resolution. For example, the captured thermal image and the predicted thermal image may both be at a low resolution. For instance, the resolution of the thermal image sensor may be a low resolution, and a neural network may calculate the predicted thermal image at the low resolution. The low-resolution captured thermal image may be compared with the low-resolution predicted thermal image to calculate the risk score.

In some examples, the captured thermal image may be at a low resolution and the predicted thermal image may be at a voxel-level resolution. The apparatus 356 may down-sample the predicted thermal image to the low resolution of the captured thermal image. Then, the low-resolution predicted thermal image may be compared with the low-resolution captured thermal image. In some examples, the down-sampling may include a variety of approaches. For example, performing down-sampling may include performing interpolation-based down-sampling, layers of max pooling, layers of average pooling, or any combination thereof.

In some examples, the risk score may be calculated 406 based on a weighted combination of a voxel-level resolution risk score and a low-resolution risk score. For example, for each layer, the calculation 406 of the risk score may be based on the voxel-level comparison, the low-resolution comparison, or both. For instance, in a use case where fine details and accurate thermal control are more significant, the voxel-level comparison may be utilized. In a use case where overall temperature distribution is more significant, the low-resolution comparison may be utilized. For use cases where an overall comprehensive quantification is more significant, a weighted combination of the risk scores from both voxel-level and low-resolution comparisons may be calculated as the final risk score.

The apparatus 356 may perform 408 a mitigation operation in response to determining that the risk score is outside of a threshold range. For example, the risk score (or a set of risk scores) may be compared to a threshold range (or a set of threshold ranges). If the risk score or scores is outside of the threshold range or ranges, the apparatus 356 may perform 408 the mitigation operation.

In some examples, performing 408 the mitigation operation may include sending an alert. In some examples, performing 408 the mitigation operation may include halting the additive manufacturing in response to determining that the risk score is outside of the threshold range for a successive number of layers.

In some examples, the threshold range is a prediction interval calculated for the layer based on a plurality of previous risk scores corresponding to a plurality of previous layers. For example, the apparatus 356 may store (e.g., record) risk scores for a plurality of layers. For instance, the apparatus 356 may record, as risk score data 372, each risk score with a corresponding layer identifier as a time series. The risk scores of a number of previous layers (L) may be utilized as a time series to forecast a risk score (of a current or subsequent layer, for example) and/or a prediction interval (of a current or subsequent layer, for example). For example, L=10. The time series and/or the prediction interval may be updated for each layer (e.g., after each layer).

In some examples, for a layer, the apparatus 356 may compare the calculated risk score with the prediction interval. If the risk score is outside of the prediction interval, the apparatus 356 may send a message (e.g., email, text, etc.) to a user or operator. Additionally or alternatively, if the risk score in more than M successive layers is outside of the prediction interval, the apparatus 356 may halt the printing job. For example, M=10.

Figure 5:
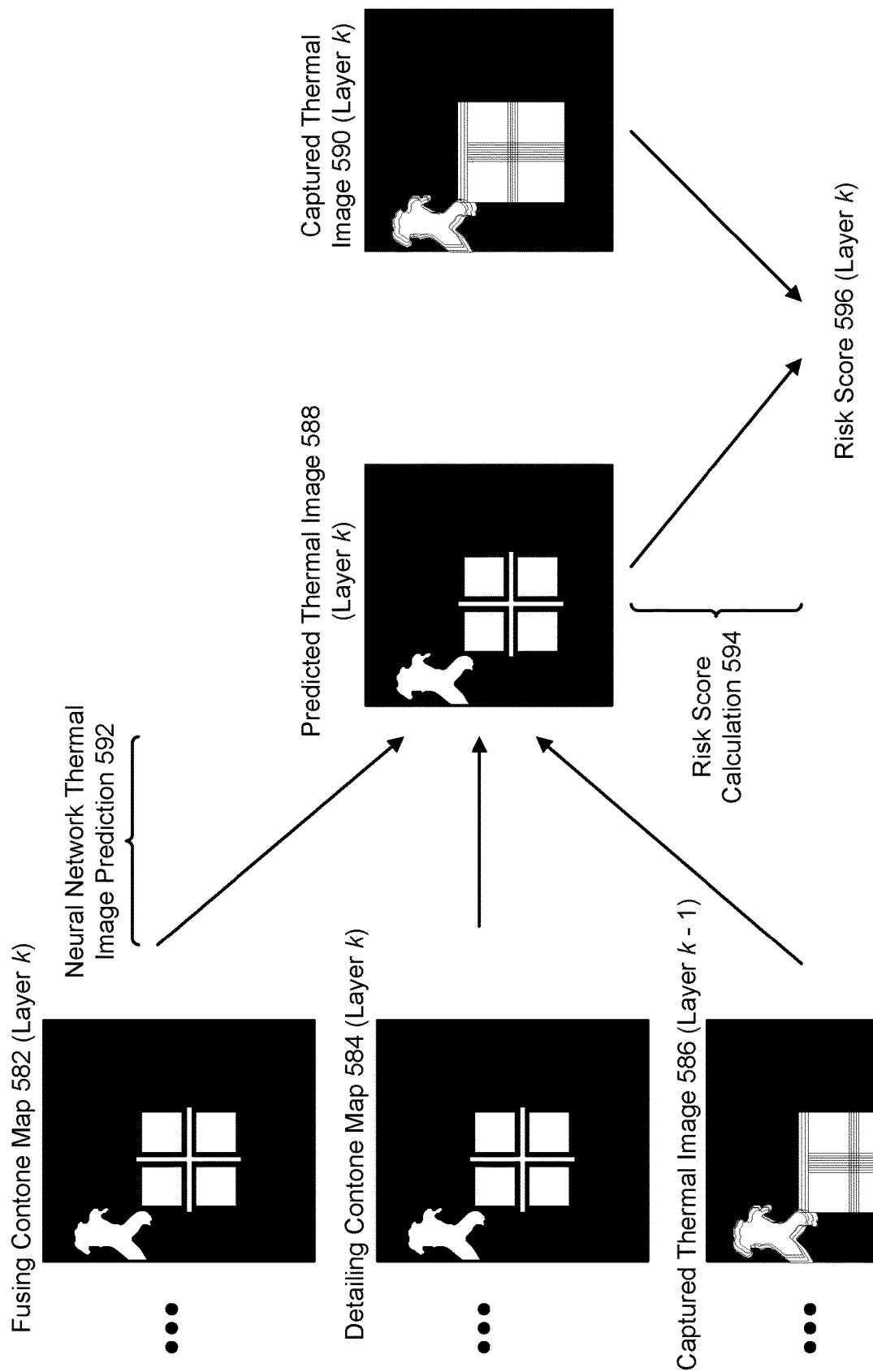
FIG. 5 is a diagram illustrating an example of a visualization of risk score calculation.

FIG. 5 is a diagram illustrating an example of a visualization of risk score calculation 594. In this example, k denotes a current layer of an additive manufacturing process. As illustrated in FIG. 5, a fusing contone map 582 for layer k, a detailing contone map 584 for layer k, and a captured thermal image 586 from a previous layer k−1 may be utilized for neural network thermal image prediction 592. In some approaches, a number of contone maps of previous layers may be utilized and/or a number of captured thermal images corresponding to layers before k−1 may be utilized in the neural network thermal image prediction 592.

The neural network thermal image prediction 592 may produce a predicted thermal image 588 for layer k. After layer k has been deposited, a captured thermal image 590 for layer k may be obtained. For example, a thermal sensor may provide the captured thermal image 590 for layer k.

The predicted thermal image 588 for layer k and the captured thermal image 590 for layer k may be utilized for risk score calculation 594. For example, the predicted thermal image 588 may be compared to the captured thermal image 590 in the risk score calculation 594 to produce the risk score 596. The risk score calculation 594 may utilize a counting approach and/or a value approach to produce the risk score 596.

It should be noted that while various examples of systems and methods are described herein, the disclosure should not be limited to the examples. Variations of the examples described herein may be implemented within the scope of the disclosure. For example, steps, functions, aspects, or elements of the examples described herein may be omitted or combined.

The invention claimed is:

1. A method for monitoring additive manufacturing by an electronic device, comprising:
    calculating, for a layer, a predicted thermal image;
    obtaining, for the layer, a captured thermal image;
    calculating, for the layer, a risk score based on the predicted thermal image and the captured thermal image; and
    performing a mitigation operation in response to determining that the risk score is outside of a threshold range, wherein the risk score is calculated with weightings based on a shape map, and wherein the weightings include a first weighting corresponding to a first area including an expanded object area and a second weighting corresponding to a second area that is complementary to the first area, wherein the first weighting is greater than the second weighting.

2. The method of claim 1, wherein calculating the risk score comprises:
    determining a difference between a pixel of the predicted thermal image and a pixel of the captured thermal image for a set of pixels; and
    counting a number of pixels having the difference greater than a threshold.

3. The method of claim 1, wherein calculating the risk score comprises:
    determining a difference between a pixel of the predicted thermal image and a pixel of the captured thermal image for a set of pixels; and
    calculating an L1 norm, an L2 norm, or a combination of the L1 norm and the L2 norm of the difference.

4. The method of claim 1, wherein the threshold range is a prediction interval calculated for the layer based on a plurality of previous risk scores corresponding to a plurality of previous layers.

5. The method of claim 1, wherein the mitigation operation comprises sending an alert.

6. The method of claim 1, wherein performing the mitigation operation comprises halting the additive manufacturing in response to determining that the risk score is outside of the threshold range for a successive number of layers.

7. The method of claim 1, wherein the risk score is calculated based on the predicted thermal image and the captured thermal image at a voxel-level resolution.

8. The method of claim 1, wherein the risk score is calculated based on the predicted thermal image and the captured thermal image at a low resolution that is lower than a voxel-level resolution.

9. The method of claim 1, wherein the risk score is calculated based on a weighted combination of a voxel-level resolution risk score and a risk score at a low resolution that is lower than a voxel-level resolution.

10. A three-dimensional (3D) printing device, comprising:
    a print head to print a fusing agent based on a fusing contone map and to print a detailing agent based on a detailing contone map;
    a thermal projector;
    a thermal sensor; and
    a controller, wherein the controller is to:
        calculate, for a layer, a predicted thermal image based on the fusing contone map, the detailing contone map, and captured thermal images of previous layers from the thermal sensor;
        obtain, for the layer, a captured thermal image of the layer from the thermal sensor;
        calculate, for the layer, a risk score based on the predicted thermal image and the captured thermal image; and
        perform a mitigation operation in response to determining that the risk score is outside of a threshold range, wherein the risk score is calculated with weightings based on a shape map, and wherein the weightings include a first weighting corresponding to a first area including an expanded object area and a second weighting corresponding to a second area that is complementary to the first area, wherein the first weighting is greater than the second weighting.

11. The 3D printing device of claim 10, wherein the weightings include a first weighting corresponding to an object area of the shape map and a second weighting corresponding to a non-object area of the shape map, and wherein the first weighting is greater than the second weighting.

12. A non-transitory tangible computer-readable medium storing executable code, comprising:
    code to cause a processor to calculate, for a layer, a predicted thermal image;
    code to cause a processor to obtain, for the layer, a captured thermal image;
    code to cause a processor to calculate, for the layer, a risk score based on the predicted thermal image and the captured thermal image; and
    code to cause a processor to perform a mitigation operation in response to determining that the risk score is outside of a threshold range, wherein the risk score is calculated with weightings based on a shape map, and wherein the weightings include a first weighting corresponding to a first area including an expanded object area and a second weighting corresponding to a second area that is complementary to the first area, wherein the first weighting is greater than the second weighting.

13. The computer-readable medium of claim 12, further comprising code to cause a processor to calculate, for a second layer, a prediction interval based on a set of risk scores corresponding to a set of layers including the layer, and wherein the code to cause the processor to calculate the prediction interval comprises code to cause the processor to model the set of risk scores as a time series.

* * * * *